Dec. 24, 1968  W. C. MOORE ET AL  3,417,746

ILLUMINATING ENDOSCOPE WITH DISPOSABLE ELEMENTS

Original Filed Nov. 22, 1965  2 Sheets-Sheet 1

INVENTORS.
WILLIAM C. MOORE &
MELVIN R. CALDWELL

BY Bruns and Jenney
Atty's.

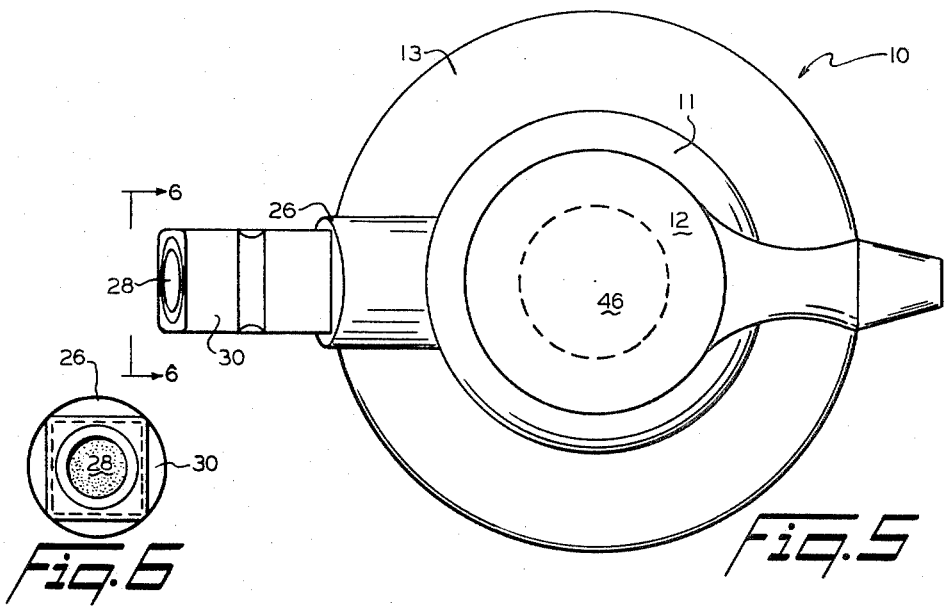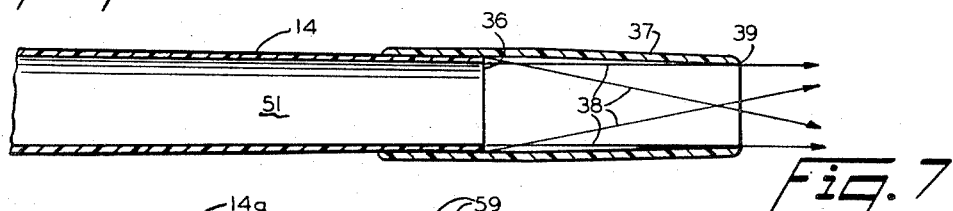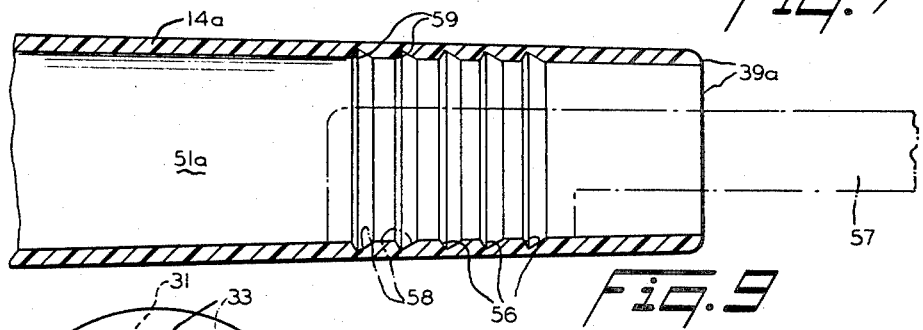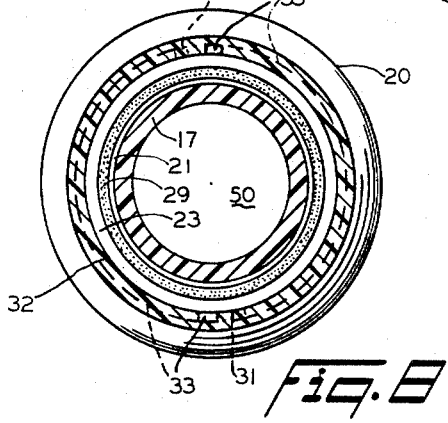

3,417,746
ILLUMINATING ENDOSCOPE WITH
DISPOSABLE ELEMENTS
William C. Moore and Melvin R. Caldwell, Skaneateles,
N.Y., assignors to Welch Allyn, Inc., Skaneateles
Falls, N.Y.
Continuation of application Ser. No. 508,976, Nov. 22,
1965. This application Feb. 27, 1968, Ser. No. 708,725
11 Claims. (Cl. 128—6)

ABSTRACT OF THE DISCLOSURE

An endoscope having means for transmitting light from a source adjacent the proximal end of the instrument to the distal end thereof, the light transmitting means including in part optical fibers and in part solid plastic material. The endoscope comprises a non-disposable light head which carries the optical fibers and is releasably engaged with disposable components including a speculum, an obturator, a liner member and an eye piece member.

---

This is a continuation of application Ser. No. 508,976, filed Nov. 22, 1965, now abandoned.

This invention relates generally to medical diagnostic instruments of the class employed for the examination of body cavities, and has special reference to a signmoidoscope in which all the parts are disposable after use except a light-source head.

The primary object of the invention is to provide an instrument of this type in which all the parts coming in contact with the patient can be thrown away after use.

Another important object is to provide an instrument of the character described which has a permanent light-source head, and other portions including a light-transmitting speculum which can be economically made and discarded after use but which has superior light-conducting characteristics for efficiently illuminating the area examined or worked on.

Still another important object is to provide a sigmoidoscope or similar instrument with a light source which remains remote from the body cavity examined together with speculum means for conducting light from the source to the area examined.

A further object is to provide such an instrument with lens means and means for preventing any contact with the light-source head, which means may be so economically made as to be disposable after a single use.

A still further object is to provide such an instrument having disposable parts so formed and arranged that, during use they prevent any contact with, or contamination of, non-disposable parts.

Other objects and advantages of the invention will become apparent from the following description in conjunction with the accompanying drawings, in which:

FIGURE 5 is a proximal end view thereof;

FIGURE 6 is an end view of a portion thereof as viewed in the direction of the arrows 6—6 in FIGURE 5;

FIGURE 7 is an enlarged sectional view of the distal end of the instrument;

FIGURE 8 is a sectional view on the line 8—8 of FIGURE 4; and

FIGURE 9 is an enlarged fragmentary longitudinal sectional view of the distal end of a modified form of speculum for use in the instrument of FIGURE 1, a tool used for forming the speculum end grooves being shown in broken lines therewith.

Figure 2:
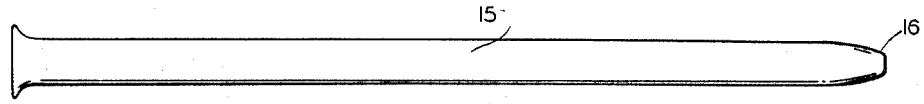
FIGURE 2 is an elevational view of an obturator for use therewith.

In the drawings, the sigmoidoscope 10 comprises a light-source head 11, an eyepiece 12 at the proximal end, a shield 13, a speculum 14 and a liner member 17. A tubular obturator 15 with rounded distal end 16 for use with the instrument in shown in FIGURE 2.

Figure 4:
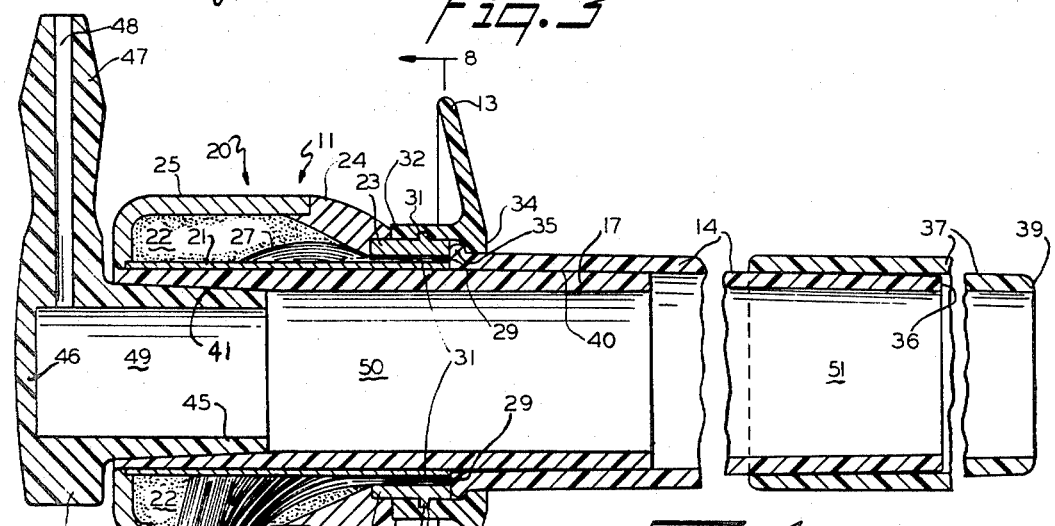
FIGURE 4 is a further enlarged fragmentary longitudinal sectional view of the instrument of FIGURE 1 with eyepiece member rotated 90°.

As shown in FIGURE 4, the head 11 comprises an outer housing 20 and an inner tubular housing 21 defining, between them, a generally annular space 22. The outer housing 20 is made of metal in four pieces, the ring portion 23, two generally cup-shaped portions 24 and 25, and, projecting from portion 25, a handle stud portion 26, the four parts being secured together, as by silver solder at the joints. The inner housing is similarly secured therein.

In the space 22 in the head, there is a bundle 27 of light-transmitting optical fibers, which fibers are clad in conventional fashion and are glass or plastic. The fibers of bundle 27 are molded by means of a suitable plastic material into the configuration that is desired for the cross section of the bundle at each point along its length, the rear portion having a circular crosss section, as shown, inside the stud portion 26 of the head. The fibers extend from a polished light-receiving surface 28 at the end of stud 26 up and around the inner housing 21 to an annular molded portion concentric with, and between, ring portion 23 and inner housing 21 at the distal end of the head, the fibers terminating at a polished light-emitting annular surface 29. The rest of space 22 is vacuum filled with epoxy resin to secure the intermediate portions of the bundle in place. The bundle 27 is adapted to transmit light from its receiving surface 28 to its annular emitting surface 29 in a manner more fully described in U.S. Patent 3,146,775 issued Sept. 1, 1964, to Moore and Connors.

The stud portion 26 of the head has a squared end 30, adapted to fit in a squared hole in a lamp handle more fully described in co-pending application Ser. No. 309,094, filed Sept. 16, 1963, by Moore and Connors, now Patent No. 3,299,884. The handle has an electrically operated high intensity lamp in close proximity to the surface 28 of the fiber bundle when the stud 30 is inserted in the handle.

As seen in FIGURES 4 and 8, the ring portion 23 of the head has a pair of diametrically opposite projecting lugs 31 and the annular shield 13 releasably secures the speculum 14 to the head utilizing these lugs. Shield 13 is of a plastic material and has a hub 32 fitting telescopically over the collar portion 23 of the head. Two half-turn interior grooved threads 33 in the hub cooperate with the lugs to secure the shield to the head when the lugs 31 are inserted in the ends of the threads 33 and the shield is given a half-turn as shown in FIGURE 8.

The distal end of shield 13 has an annular flange 34 fitting closely around the proximal end of the speculum 14. The speculum is provided with an annular outwardly projecting bead 35 at this end and the flange 34 draws the end of the speculum up against the distal end of head 11 when the shield 13 is given its half-turn.

Speculum 14 is made of a clear transparent plastic material such as "Lucite" having good light-transmitting properties. The annular proximal end of the speculum is smooth so as to provide a light-receiving optical surface which abuts against the annular light-emitting surface 29 of the fiber bundle 27 of the head. Light carried by the fibers of bundle 27 is transmitted by the tubular sidewall of the speculum to its distal end which has a smooth light-emitting annular surface 36. The outer and inner sidewall surfaces of speculum 14 may be coated with a plastic material having a different refractive index from the material of the sidewall to improve its light-conducting properties.

The distal end of speculum 14 has a tubular tip 37 of plastic material therearound and secured by bonding thereto. The tip extends a substantial distance past the surface 36 so that light rays, represented by the arrows 38 in FIGURE 7, diverge as they emerge from the surface 36 and are directed over the entire area defined by the distal rounded end 39 of the tip 37.

Figure 3:
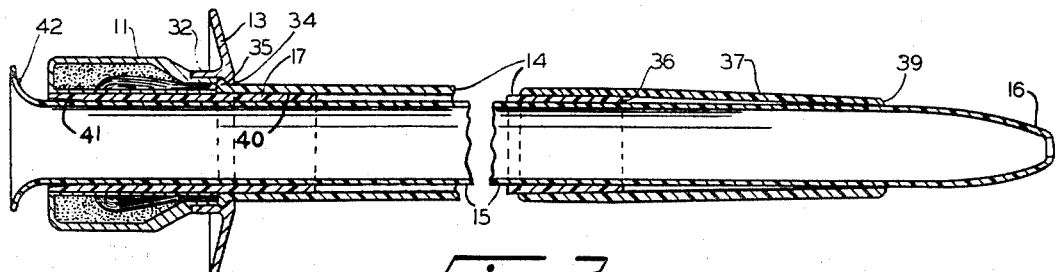
FIGURE 3 is a fragmentary enlarged longitudinal sectional view of the instrument of FIGURE 1 with obturator in place.

The sidewall of speculum 14 is tapered inwardly very slightly from proximal to distal end, as seen in FIGURE 3. Liner member 17, which is also of plastic material, fits within the tubular inner housing portion 21 of the head, the taper of the speculum at 40 limiting the movement of the liner into the speculum. It will be noted that liner 17 extends from the proximal end of the head well past the proximal end of the speculum when it is in position.

The inner surface of the liner 17 is tubular having a slight outwardly tapered portion at 41 at its proximal end. The tubular obturator 15 is formed to slide telescopically within liner 17 and thence through the speculum 14 so as to protrude from the distal end of the speculum tip 37. The tapered sidewall of the speculum 14 converges at its distal end just enough so that a telescopically sliding fit between obturator and speculum is provided at this end. The end of tip 37 is similarly tapered so that the same sliding fit is provided between obturator and tip at its distal end 39, as shown in FIGURE 3. Motion of the obturator distally in the instrument is limited by the flaring, bell-mouth proximal end 42 of the obturator.

When the obturator is withdrawn from the instrument, the eyepiece 12 can be inserted. The eyepiece is of molded transparent plastic material and has a tapered hollow cylindrical shank portion 45 insertable in the tapered portion of liner 17 at 41. The proximal end is closed by a lens portion 46 preferably molded as an integral portion of the eyepiece. Alternatively, a lens of other material may be secured in conventional manner to this end of the eyepiece.

Eyepiece 12 is provided with a projecting nipple 47 having a central passage 48 communicating with the interior 49 of shank portion 45 for insufflation or smoke removal when the nipple is connected by a flexible hose to air under pressure or vacuum, respectively.

The hollow interior 49 of the eyepiece, passage 50 through the tubular insert 17, and the passage 51 through the hollow interior of the speculum provide a viewing passage through the instrument. Light transmitted from the head through the sidewall of the speculum 14 illuminates the area at the distal end 39 of the tip 37 when viewed through the eyepiece lens 46.

Figure 1:
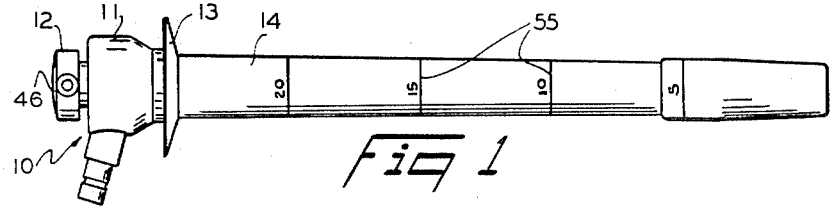
FIGURE 1 is an elevational view of a sigmoidoscope according to the invention.

In operation, the instrument 10 with eyepiece 12 removed and obturator 15 substituted, is inserted in the body cavity to be examined. A scale 55 (FIG. 1) may be marked on the speculum to assist the physician in determining the location of the area examined. The obturator is removed and eyepiece 12 substituted to view the area to be examined. Eyepiece 12 may be removed for the insertion of any desired instrument if work on the area is required, the area at the tip end 39 being still illuminated.

After use, the speculum being of comparatively inexpensive material may be discarded to save the time and expense of cleaning and sterilizing. Similarly, obturator 15, liner 17, shield 13, and eyepiece 12, may be discarded and new parts used with the head 11 when the instrument is next used. Shield 13 prevents any contact between patient and head 11 and liner 17 prevents any contact between the head and the contaminated obturator 15.

FIGURE 9 shows a modified form of speculum 14a without a tip portion 37. The proximal end of speculum 14a, not shown, is the same as speculum 14. At its distal end the interior of the speculum has a plurality of angular and annular grooves 56 cut or ground by a tool 57, indicated in broken lines, having sawtooth projections 58. Each groove 56 has a smooth and polished surface 59 which faces angularly distally, providing light-emitting surfaces spaced from the distal end 39a of the speculum. Light conducted through the sidewall of the speculum 14a is thereby emitted and scattered over the area defined by the annular end 39a to illuminate the area examined or worked upon. Alternatively, other means may be used for obtaining light-emission from this end of the speculum as, for example, sand-blasting or frosting the internal surface to obtain light-emissive surfaces.

From the foregoing description it will be apparent that the invention disclosed herein provides a novel and very practical construction for a sigmoidoscope, otoscope, anoscope, bronchoscope, or the like, which construction affords illumination as well as novel means for assembling and disassembling the instrument. Furthermore, the disposable parts of the instrument, being made of comparatively inexpensive material may be discarded after use and, by their novel construction and arrangement, prevent contamination of the comparatively expensive head so that it may be used and reused.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. In a medical instrument of the character described, a light source head having a light transmitting bundle of optical fibers terminating in a substantially annular configuration in a light emitting annular surface at the distal end of the head, the head having a viewing passage therethrough concentrically aligned with said light emitting annular surface, the bundle terminating proximally of the head in a light receiving surface adapted to receive light from a light source, a hollow elongated speculum including a substantially tubular member of plastic material having light conductive characteristics, the proximal end of the member having a light receiving annular surface, and means for removably securing the member to the head with the annular surfaces of head and member in face to face relation, the speculum having a viewing passage therethrough in continuation of the head viewing passage.

2. A medical instrument as defined in claim 1, characterized by the tubular member terminating distally in an annular light emitting surface, the speculum including a tapered hollow tip of plastic material extending distally substantially beyond the annular distal surface of the tubular member.

3. A medical instrument as defined in claim 1, characterized by the tubular member having surface discontinuity means adjacent its distal end for causing light emission at that end.

4. A medical instrument as defined in claim 1 characterized by the tubular member having at least one internal annular groove spaced from its distal end, the groove having in part an annular light emissive surface facing substantially distally of the speculum.

5. A medical instrument as defined in claim 1 having a substantially annular member engageable around the distal end of the head, the head having fastening means at its distal end, the annular member having fastening means cooperable with said head fastening means, the proximal end of the speculum having means engaged by the annular member for securing the annular surfaces of head and tubular member in face to face relation.

6. A medical instrument as defined in claim 1 in combination with an obturator having a rounded distal end, the instrument having a substantially tubular liner member engaged within the viewing passages in the head and speculum and extending from the proximal end of the head at least partially into the speculum tubular member to prevent contact between obturator and head when the obturator is withdrawn.

7. In a medical instrument of the character described, a light source head having a light transmitting bundle of optical fibers terminating in a substantially annular configuration at the distal end of the head, the fiber ends presenting an axially facing, optically ground and polished surface at said distal end, the head having an axially centered viewing passage therethrough, and a hollow speculum of plastic material having light conductive characteristics removably secured to the head, the speculum having annnular surface at its proximal end confronting the polished surface of the head in contiguous relation thereto for conducting light from the optical fibers to the distal end of the speculum and having a viewing passage therethrough axially aligned with the viewing passage through the head, the speculum also having a plurality of angular internal grooves spaced from its distal end, each groove having in part a smooth surface facing substantially distally of the speculum.

8. In a medical instrument of the character described, light source head having a light transmitting bundle of optical fibers terminating in a substantially annular configuration at the distal end of the head, the fiber ends presenting an axially facing, optically ground and polished surface at said distal end, the head having an axailly centered viewing passage therethrough, a hollow speculum of plastic material having light conductive characteristics removably secured to the head, the speculum having an annular surface at its proximal end confronting the polished surface of the head in contiguous relation thereto for conducting light from the optical fibers to the distal end of the speculum and having a viewing passage therethrough axially aligned with the viewing passage through the head, an obturator having a rounded end, and a substantially tubular liner member engaged within said viewing passages and extending from the proximal end of the head at least partially into the speculum to prevent contact between the obturator and head during use of the instrument.

9. A medical instrument as defined in claim 8 having a hollow eyepiece member telescopically insertable into the proximal end of the liner member, and a viewing lens at the proximal end of the eyepiece member adapted to close said proximal end.

10. A medical instrument as defined in claim 9 wherein the eyepiece member is of plastic material and the viewing lens is formed integrally therewith.

11. In a medical instrument of the character described, a light source head having a light transmitting bundle of optical fibers terminating in a substantially annular configuration at the distal end of the head, the fiber ends presenting an axially facing, optically ground and polished surface at said distal end, the head having an axially centered viewing passage therethrough, a hollow speculum of plastic material having light conductive characteristics removably secured to the head, the speculum having an annular surface at its proximal end confronting the polished surface of the head in contiguous relation thereto for conducting light from the optical fibers to the distal end of the speculum and having a viewing passage therethrough axially aligned with the vewing passage through the head, and a substantially annular shield member having a hub engageable with the distal end of the head, the head and hub having coacting fastening means, the proximal end of the speculum having a radially outward projecting portion, and the shield member having a radially inward projecting portion engageable with the outward projecting portion of the speculum, whereby the shield member is slid around the speculum with the projecting portions interengaged and then the fastening means are interengaged to secure the speculum to the head.

References Cited
UNITED STATES PATENTS

| | | |
|---|---|---|
| 1,791,794 | 2/1931 | Chesney. |
| 2,247,258 | 6/1941 | Shepard. |
| 2,699,770 | 1/1955 | Fourestier et al. |
| 2,769,441 | 11/1956 | Abramson. |
| 3,146,775 | 9/1964 | Moore et al. |
| 3,261,349 | 7/1966 | Wallace. |

FOREIGN PATENTS

| | | |
|---|---|---|
| 547,291 | 3/1932 | Germany. |

OTHER REFERENCES

Surgery, Gynecology, and Obstetrics, May 1965, pp. 48–49.

RICHARD A. GAUDET, *Primary Examiner.*

K. L. HOWELL, *Assistant Examiner.*

U.S. Cl. X.R.

128—398; 350—96